Figure 1:
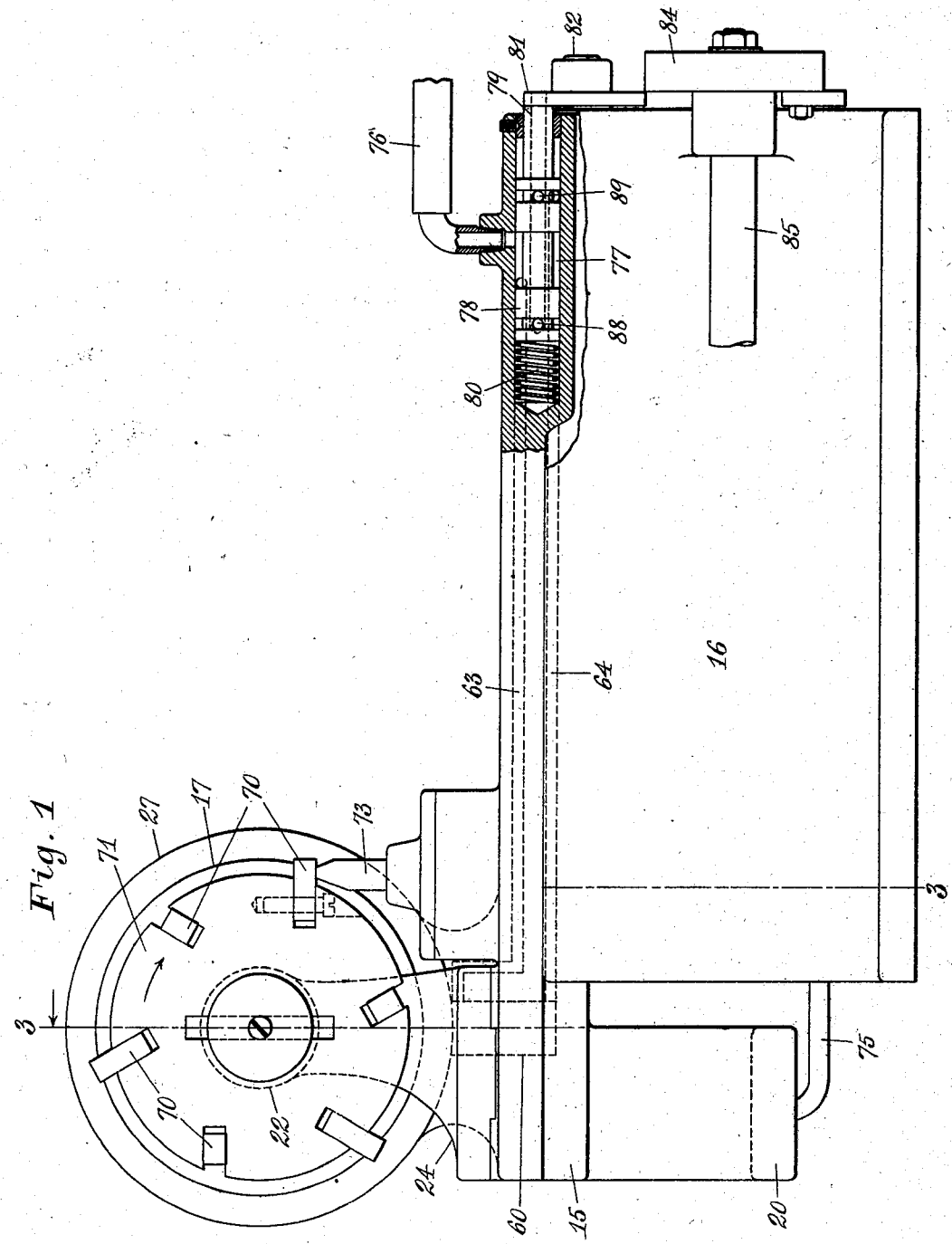

No. 728,573. PATENTED MAY 19, 1903.
B. M. W. HANSON.
FLUID PRESSURE OPERATED INDEXING APPARATUS.
APPLICATION FILED JAN. 29, 1902.

NO MODEL. 6 SHEETS—SHEET 1.

Witnesses:
H. Mallner
Joseph Merritt

Inventor
B. M. W. Hanson
By W. H. Honiss Att'y

No. 728,573. PATENTED MAY 19, 1903.
B. M. W. HANSON.
FLUID PRESSURE OPERATED INDEXING APPARATUS.
APPLICATION FILED JAN. 29, 1902.
NO MODEL. 6 SHEETS—SHEET 2.

Witnesses:
H. Mallner
Joseph Merritt

Inventor
B. M. W. Hanson
By W. H. Honiss, Atty.

No. 728,573. PATENTED MAY 19, 1903.
B. M. W. HANSON.
FLUID PRESSURE OPERATED INDEXING APPARATUS.
APPLICATION FILED JAN. 29, 1902.
NO MODEL. 6 SHEETS—SHEET 3.
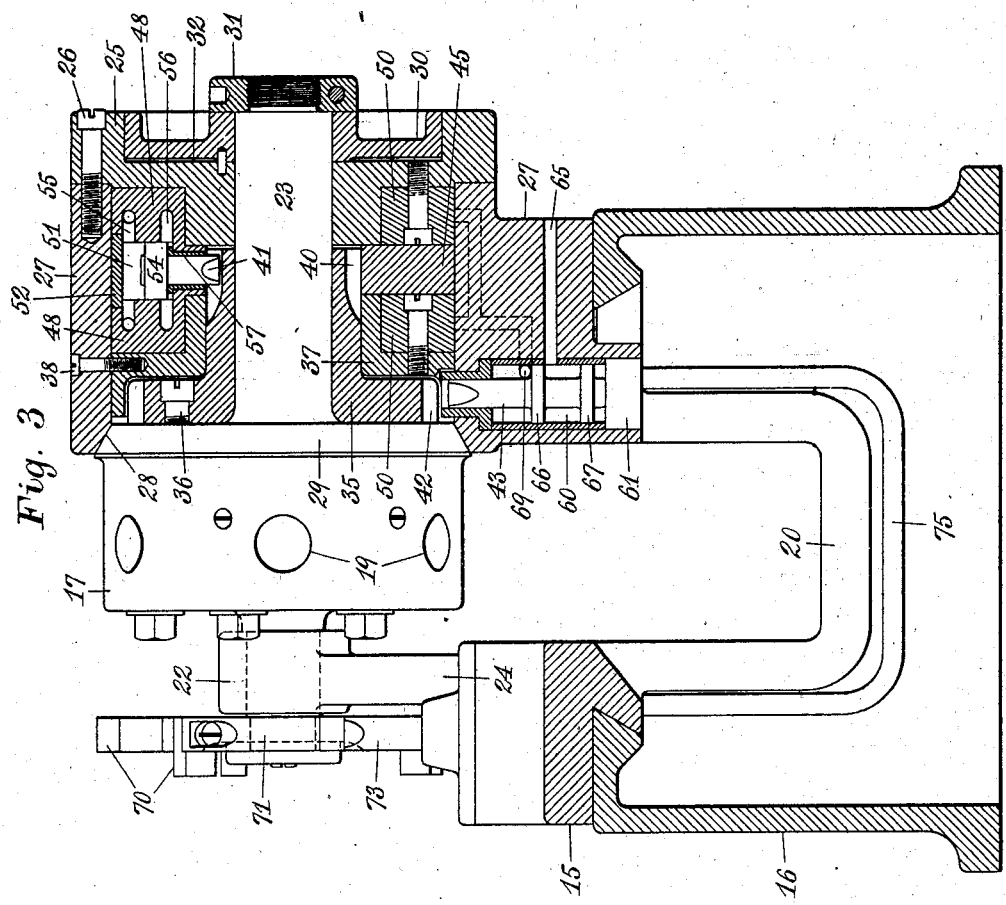
Witnesses:
H. Mallner
Joseph Merritt
Inventor
B. M. W. Hanson
By W. H. Honiss, Atty.

No. 728,573. PATENTED MAY 19, 1903.
B. M. W. HANSON.
FLUID PRESSURE OPERATED INDEXING APPARATUS.
APPLICATION FILED JAN. 29, 1902.
NO MODEL. 6 SHEETS—SHEET 4.
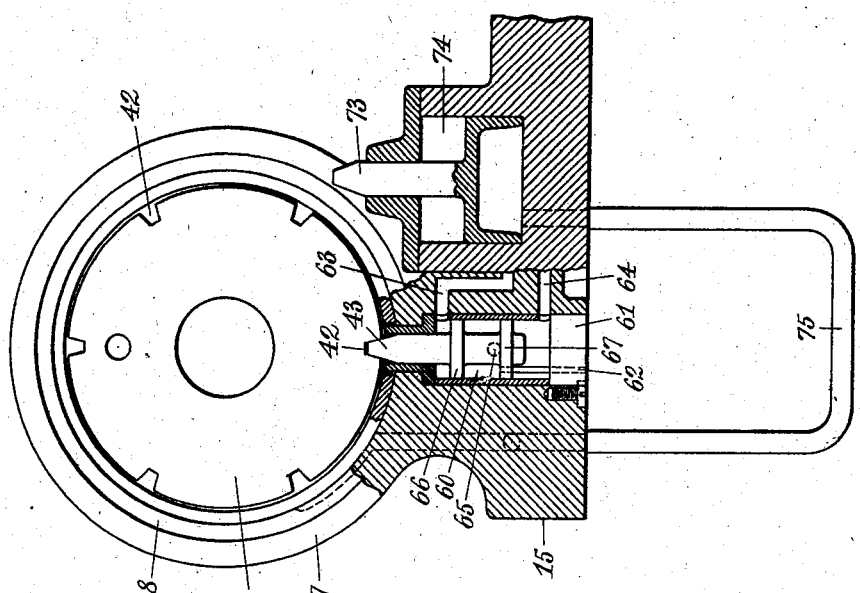
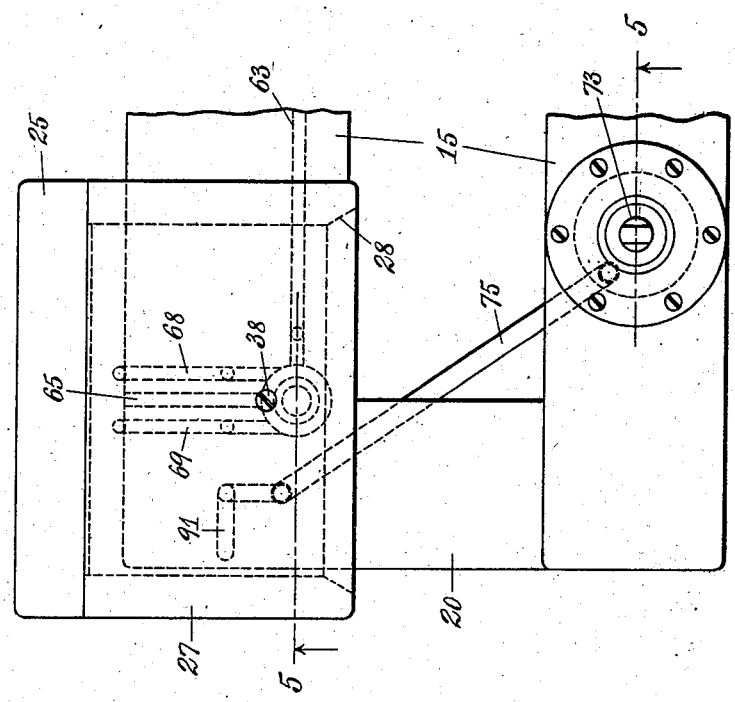
Witnesses: Inventor
H. Mallner B. M. W. Hanson
Joseph Merritt By Wm H Honiss Atty.

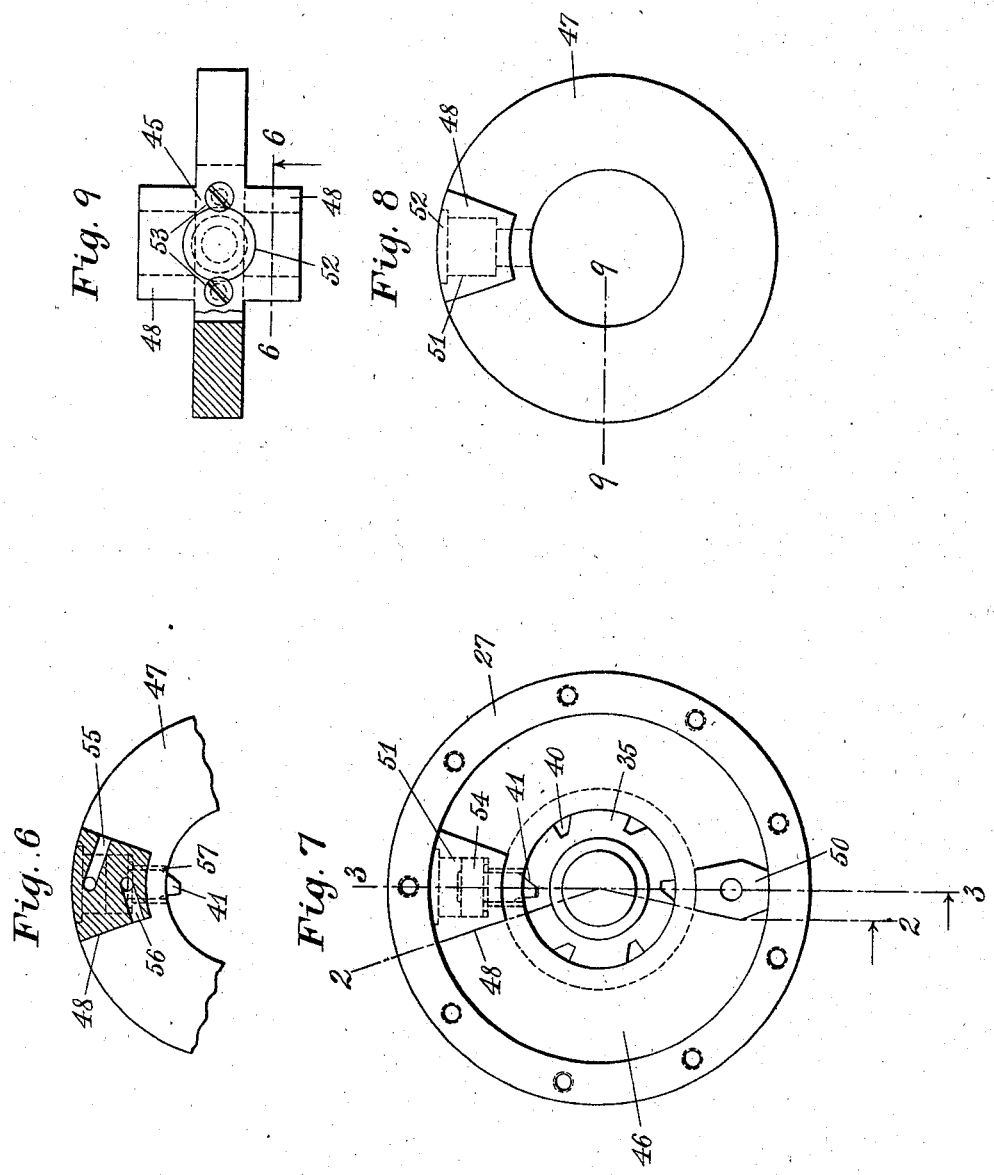

No. 728,573. PATENTED MAY 19, 1903.
B. M. W. HANSON.
FLUID PRESSURE OPERATED INDEXING APPARATUS.
APPLICATION FILED JAN. 29, 1902.
NO MODEL. 6 SHEETS—SHEET 6.
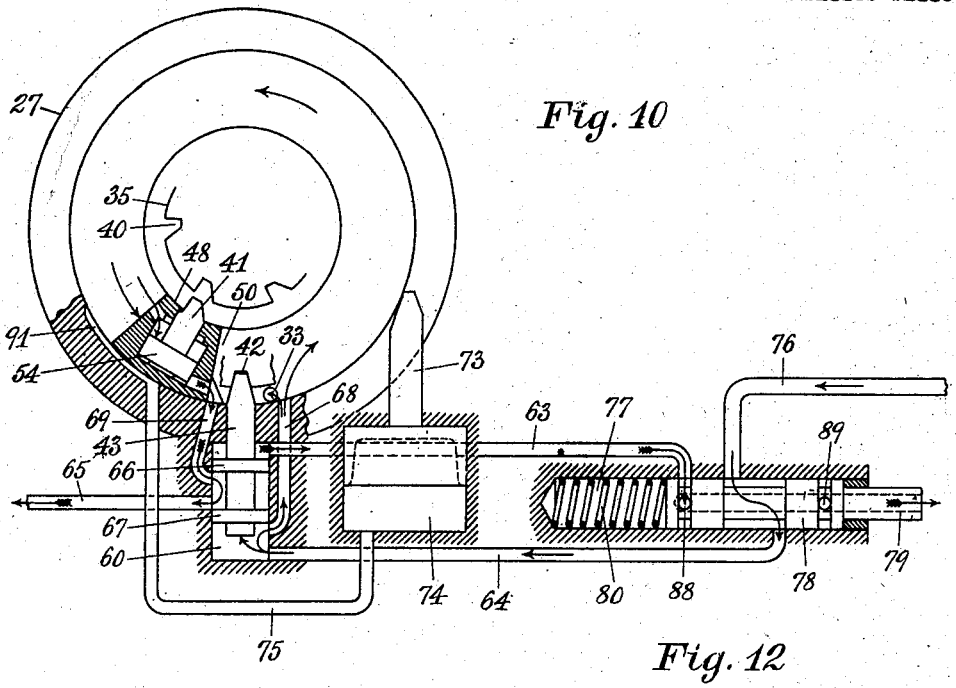
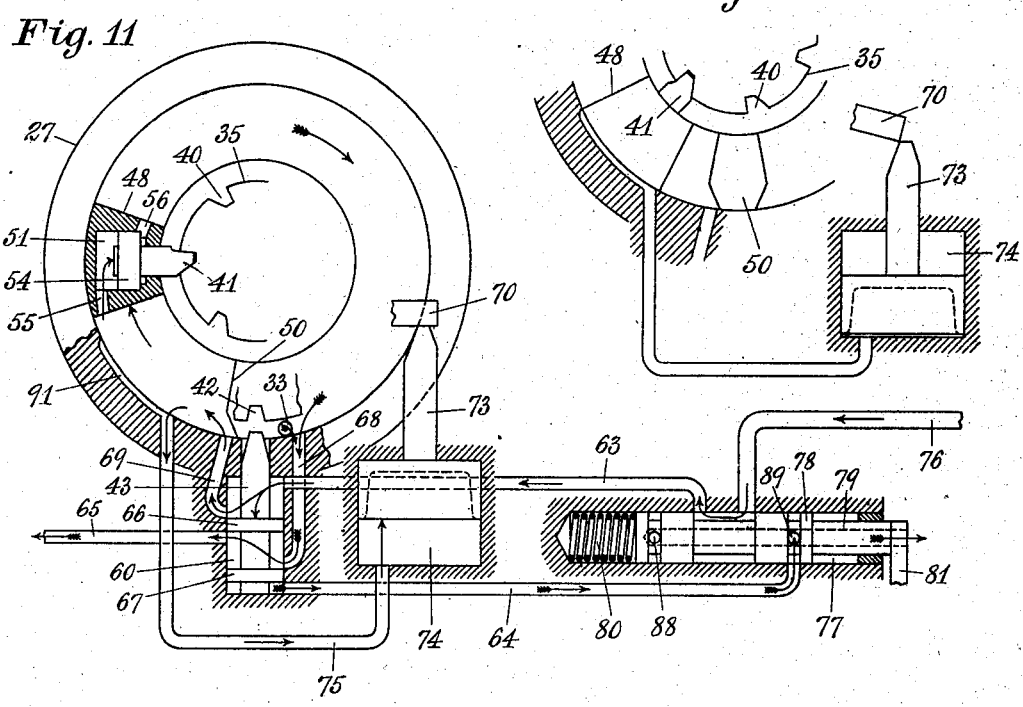
Witnesses:
H. Mallny
Joseph Merritt
Inventor
B. M. W. Hanson
By W. H. Honiss, Atty.

No. 728,573. Patented May 19, 1903.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-PRESSURE-OPERATED INDEXING APPARATUS.

SPECIFICATION forming part of Letters Patent No. 728,573, dated May 19, 1903.

Application filed January 29, 1902. Serial No. 91,684. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Fluid-Pressure-Operated Indexing Apparatus, of which the following is a specification.

This invention relates to fluid-pressure devices for operating the intermittently-rotating parts of machinery of various kinds, such as the indexing plates and heads of milling-machines, gear-cutting machines, and the monitor or turret heads of lathes, screw-machines, chucking-machines, and similar machinery.

The invention furthermore comprises means for readily varying the extent of the indexing movement from any fraction of a rotation up to nearly a full rotation, and also comprises means for cushioning the impact of the indexed member or members at the required indexed positions and for returning the indexed member to its correct position from the varying overrunning positions to which it is carried by its momemtum, also for automatically locking and clamping the indexed member at its respective stopping or indexed positions during the time that it is at rest therein. These principal functions of the mechanism are performed by means of fluid-pressure engines, to which the fluid-pressure is admitted at suitable times for performing those functions in the required sequence. The amplitude of movement of the engine for advancing the indexed member is capable of imparting nearly a complete rotation to that member, and instead of being adapted or adjusted to move approximately the required amount for each step of the advancing movement it continues to move until it is stopped by the opposing action of another engine at the required stopping position, the latter engine having a power somewhat greater than the first, whereby the indexed member is returned to its correct position by whatever extent it overruns the desired movement, the extent of overrun varying somewhat by reason of the weight of the indexed member and its appurtenances and also by variations in the speed of the movement or in the distance through which it is moved.

This invention is herein shown as being adapted to the indexing, stopping, and clamping of a monitor-head or tool-turret of a lathe or screw-machine.

Figure 2:
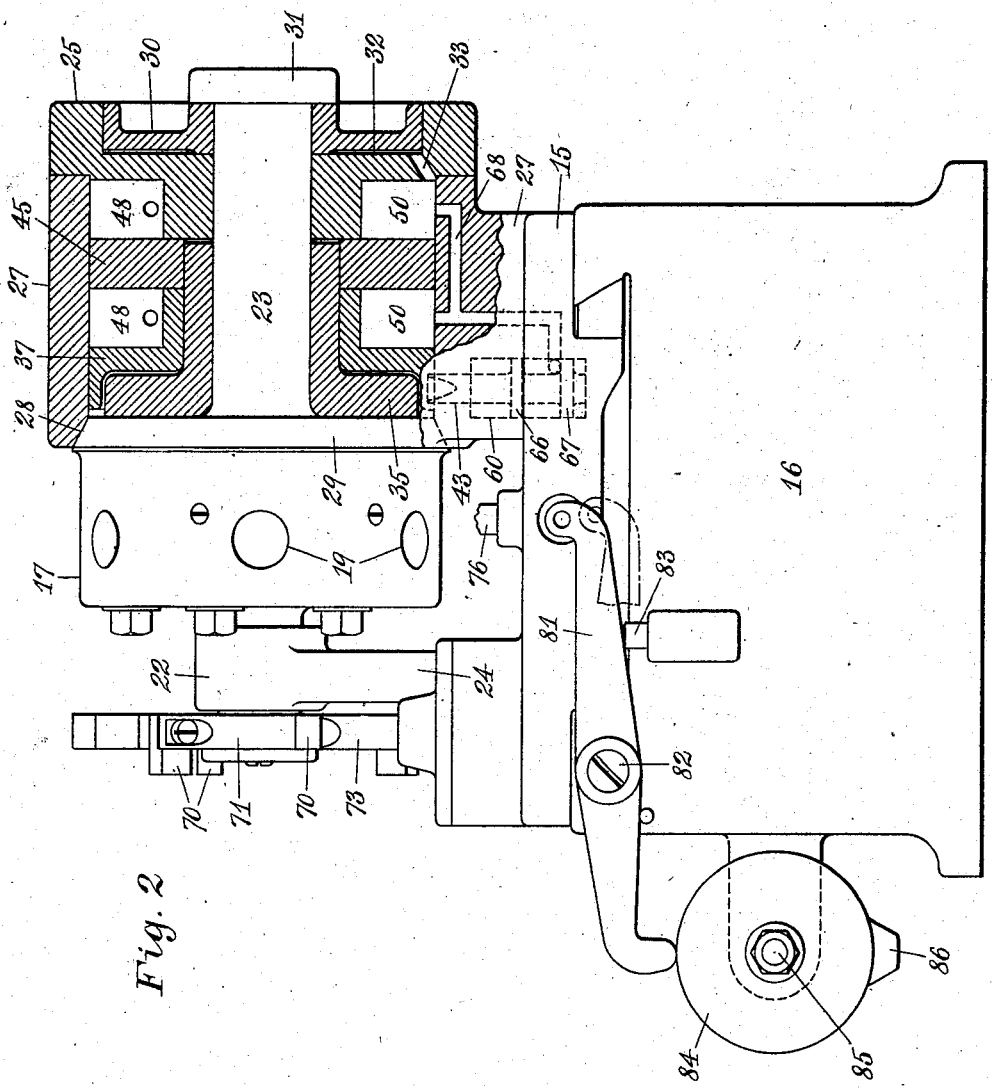

Figure 1 of the drawings is a side view showing the turret and the longitudinally-movable slide upon which it is mounted, a portion of the rearward end of the slide being shown in section in order to represent the valve devices more clearly. Fig. 2 is a rear end view of the machine of Fig. 1, projected from the right-hand end thereof, partly in section, taken on the line 2 2 of Fig. 7. Fig. 3 is a rearward end view, partly in section, taken on the line 3 3 of Figs. 1 and 7. Fig. 4 is a plan view of the forward end of the turret-slide, showing the position and arrangement of the pipes and passages for conveying the fluid-pressure. Fig. 5 is a front view, partly in section, taken along the lines 5 5 of Fig. 4, showing the locking-bolt and the cushioning-stop and buffer for the turret. Fig. 6 is a rear view of a portion of the oscillating piston in section, taken on the line 6 6 of Fig. 9. Fig. 7 is a rear view of the turret-cylinder with its rearward flanged head removed, showing the indexing-piston in position therein. Fig. 8 is a rearward view of the oscillating piston shown separately, while Fig. 9 is a plan view of the piston, projected from Fig. 8, partly in section, taken on the line 9 9 of Fig. 8. Figs. 10, 11, and 12 are diagrammatic views showing the valve and the ports and passages for the fluid-pressure and the members operated upon by that pressure in different positions of movement or operation. These parts are not here shown in their correct relative position, but are shown as though they were in the same plane, as to enable each of their operative positions and relations to be seen in a single view. Fig. 10 represents the valve in position for admitting the pressure to lock the turret-head and return the indexing-pawl to its initial or resting position. Fig. 11 shows the valve in position for admitting the pressure to retract the locking-bolt, to advance the pawl and its piston, and to hold the buffer or cushioning-stop to its work, while Fig. 12 represents the action of the parts at the first portion of each forward indexing movement.

In the embodiment of this invention herein shown the principal operated parts are mounted upon a turret-slide 15, which is fitted to slide longitudinally upon the bed or table 16, the latter being attached to or integral with the bed or frame of the machine with which this apparatus coöperates. The means for reciprocating the slide 16 upon its bed or table may be of any approved form, of which many kinds are well known to those skilled in this art, those driving devices being so connected or correlated with the other devices of the associated machine as to operate in proper time and to a suitable extent.

The turret or monitor head 17 is here shown to be mounted at the forward end of the slide, with its axis in a horizontal position transversely to the slide. This turret is provided with a series of holes 19 or any other approved means for receiving and clamping a set or a series of tools to be carried by the turret. The front end of the slide is bifurcated, as best shown in Figs. 3 and 4, to permit long projecting tools to clear the slide as they swing around with the turret, the bifurcated ends of the slide being preferably connected and braced by means of the U-shaped connecting-piece 20. The opposite ends of the turret are provided with journals 22 and 23, the former of which has a bearing in the bracket 24 at the front of the slide, while the rearward journal 23 takes a bearing in the flanged head 25, which is secured, by means of screws 26, to the rearward side of a large boss 27, attached to or integral with the forward end of the turret-slide 15. That boss is bored out to receive the annular piston 45 and other devices for operating the turret, and the forward end of the bore is beveled at 28 to receive a correspondingly-beveled surface 29 of the turret 17, these beveled surfaces serving as an end bearing against rearward movement of the turret and coöperating also with the means for clamping the turret in position when at rest. The rearward journal or stem 23 of the turret extends beyond its flanged bearing 25 and receives the clamping-piston 30 and the screw-collar 31, which forms the opposite end bearing of the turret, the latter fitting in its bearing, so that when not clamped it may be freely turned by its indexing mechanism. The clamping-piston 30 is seated in an annular recess in the rearward side of the flanged head 25, which thus serves as a cylinder for the piston, a clearance-space 32 being provided between the adjacent faces of the piston and the head, to which fluid-pressure is admitted through the passage 33 at suitable times to clamp the turret securely in its beveled seat 28 of the boss 27 while the tools are at work. This clamping-piston 30 is preferably pinned or splined to its cylinder 25, as here shown, so as to prevent it from turning with the piston.

As a means for intermittently rotating the turret 17 it is provided with a pawl-and-ratchet mechanism. The ratchet 35, which may be integral with the turret, but is for convenience of construction and assembling preferably a separate member, is securely fixed to the turret by means of screws 36 or in any other well-known way. This ratchet is preferably provided with a journal seated in the bearing-ring 37, which is secured to the boss 27 by means of screws 38 and assists in preserving the axial relation of the turret and also coöperates with the flanged head 25 to form an annular pressure-chamber for the pawl-piston, as will be more fully described herein. The ratchet 35 is provided with an annular series of notches 40, Figs. 3 and 7, for coöperating with the indexing-pawl 41, the number of these teeth corresponding with the number of tools carried by the turret, which in this case is six. The ratchet 35 is also provided with a corresponding number of locking-notches 42 for engaging with the locking-bolt 43, Figs. 3 and 5, these locking-notches being so located as to hold the turret, with its tools, in proper relation to the work.

The indexing-pawl 41 is made in the form of a piston and is mounted in a substantially radial relation in an annular piston 45, which is shown in detail in Figs. 6, 7, 8, and 9, and is mounted to rotate or oscillate in an annular pressure-chamber 46, the outer peripheral wall of which is formed by the boss 27, while the side walls are formed by the inwardly-facing sides of the flanged head 25 and the bearing-ring 37. The cross-sectional area of the complete annular portion 47 of the piston 45 is shown in cross-section in Figs. 2 and 9 and serves to divide the pressure-chamber 46 into two substantially equal parts, the cross-sectional area of which is best shown in Fig. 2. The annular piston 45 is provided with oppositely-disposed wings 48, which project into and fill the annular pressure-chambers 46 and serve as the moving abutments of the piston 45, upon which the pressure in the chambers 46 takes effect.

The thrust-blocks 50 are closely fitted in the pressure-chambers 46 and are attached to the flanged head 25 and the bearing-ring 37 by means of screws or in any other secure manner. They serve as stops for the rearward movement of the annular piston at the position shown in Fig. 10 and serve also as thrust members or abutments, against which the pressure in the cylinder reacts when moving the piston 45 in either direction.

The pawl 41 is mounted to reciprocate in a substantially radial relation to the annular piston 45 in a pressure-chamber 51, that chamber and the piston-pawl being preferably cylindrical, so that the chamber can be conveniently bored through the outer side of the piston 45 and the end thereof closed by means of a cap 52, secured by screws 53. The piston-pawl 41 is double-acting, having an enlarged head 54, to the opposite sides of which the pressure is admitted through the ports 55 and 56, respectively, from the pressure-chamber 46 on opposite sides of the wings 48. The inner end of the pawl is preferably guided in a close-fitting bushing 57, the lower end of the pawl being shaped for engagement with the notches 40 of the ratchet 35.

The locking-bolt 43 is also made in the form of a piston mounted in a pressure-chamber 60 beneath the ratchet 35, in the plane of the notches 42 thereof, Figs. 3 and 5, and is preferably fitted in bushings the seats for which are bored in the turret-slide 15. The lower end of the pressure-chamber is closed by a suitable plug 61, and the bolt is held from turning by any suitable means, as the pin 62. The upper end of the bolt is slightly tapering or wedge-shaped to coöperate with the similarly-shaped notches 42, so as to enable the bolt to adjust the turret accurately and hold it securely in its required rotative positions. Pressure is conducted to the locking-bolt chamber by the inlet-passages 63 and 64, and provision for exhausting that chamber is made by the exhaust-passage 65, located between the two heads 66 and 67 of the locking-bolt. This pressure-chamber 60 for the locking-bolt also communicates, by means of the passage 68, with one end of the pressure-chambers 46 and by means of the passage 69 with the other end of those pressure-chambers, thereby maintaining coöperative relation between the two pressure-chambers, as best illustrated in Figs. 10 and 11 and as will be hereinafter more fully described.

The amplitude of movement of the oscillating piston 45 is nearly a complete rotation, its limits being the opposite sides of the thrust-blocks 50. In order to stop the turret at different desired intermediate positions, the apparatus is provided with a stopping and cushioning device comprising a stop or buffer operated by fluid-pressure and a series of coöperating selecting-dogs carried with the turret. The arrangement and operation of these devices is best shown in Figs. 1, 2, and 11. The selecting-dogs 70 are pivotally mounted in a disk 71, which is fixed to or integral with the turret 17. These dogs correspond in number and position with the required stopping positions of the turret, equaling the number of notches of the ratchet 35, and are arranged to be swung into or out of engaging relation to the stop or buffer 73. That buffer is in the form of a piston mounted in the pressure-chamber 74 in the slide 15, the area of the chamber being greater than the combined cross-sectional areas of the two pressure-chambers 46, with which the chamber 74 is connected by means of the passage 75, so that the buffer will control the movement of the turret through its coengaging dog 70 when the same pressure is in both chambers, as in Fig. 11.

The inlet-passages 63 and 64, leading to the upper and lower ends, respectively, of the pressure-chamber 60, communicate with a valve-chamber 77, provided with an inlet-pipe 76, which is located at the rearward end of the slide and is connected with a fluid-pressure supply by suitable jointed or telescoping connections, which permit the longitudinal movement of the slide and its attached end of the inlet-pipe 76. The time of admission of the pressure to the passages 63 and 64 is controlled by means of the valve 78, which when in the position shown in Fig. 11 admits the pressure through the passage 63 to retract the locking-bolt and advance the turret and when in the position shown in Fig. 10 admits the pressure to the passage 64 to lock and clamp the turret and return the pawl and its annular piston to their rearward or resting position. In each of these positions the valve while admitting the pressure to one of the passages also permits the pressure to be exhausted from the other passage through the ports 88 and 89 into the longitudinal exhaust-passage 79 and thence either into the open air, as here shown, or into a suitable exhaust-pipe. The valve 78 is mounted in the valve-chamber 77 at the rearward end of the slide and projects through the end thereof into engaging relation with an abutment or dog 81. While the turret is stationary for the operations of the respective tools, which is usually during a greater portion of the time, the valve rests in the position shown in Fig. 10, being yieldingly held in that position by means of the spring 80. The valve is moved to the position of Fig. 11 by colliding with the dog 81, which is mounted upon the bed 16 at the rearward end of the turret-slide and at the rearmost position of that slide, so that in accordance with the usual requirement the turret may be indexed to bring the next tool in position while the slide 15 is at the rearward end of its longitudinal movement.

In order to enable the slide and turret to repeat one or more of their forward movements without advancing the turret, the dog 81 is herein shown in the form of a swinging lever pivotally mounted at 82 upon the bed and held to its operative position (shown in Figs. 1 and 2) by means of a spring-plunger 83, the opposite end of the lever being extended in engaging relation to a cam-disk 84 upon a shaft 85, which is driven coincidently with or in suitable relation to the principal controlling or operating shafts or other mechanism of the machine. One or more cam-pieces 86 are attached to the cam-disk, so as to collide with the dog 81 at the required times and swing its rearward end out of engaging relation with the valve, as shown in dot-and-dash lines in Fig. 2, when the latter is not to be operated at any particular stroke or strokes of the slide.

The operation of this apparatus is as follows, reference being had to the diagrammatic views of Figs. 10, 11, and 12: During the operation of the tools upon the work while the turret-slide is away from its rearward position, and therefore carries the valve 78 out of contact with the reversing-dog 81, that valve is held in the position shown in Fig. 10, with the pressure admitted through the passage 64 and operating in the chamber 60 to hold the locking-bolt 43 in its upper position, through the passage 68, and around the annular pressure-chambers 46 to hold the annular piston 45 at the rearward end or limit of its movement against the thrust-blocks 50, through the passage 33 to clamp the turret, and operating through the port 56 to hold the indexing-pawl 41 in its outward position clear of the ratchet 35. When the slide reaches the rearward end of its movement, the projecting stem of the valve collides with the dog 81, moving the valve to the position shown in Fig. 11, so that the pressure enters through the passage 63 and operates in the pressure-chamber 60 to push the bolt 43 downwardly and uncover the entrance from that chamber to the passage 69, through which the pressure then passes to the pressure-chambers 46 and entering the pressure-chamber 51 through the port 55 moves the pawl 41 into engagement with its adjacent notch 40 of the ratchet 35, after which the continuing pressure takes effect against the rearward sides of the wings 48 of the annular piston 45 and pushes that piston around, carrying with it the ratchet and the turret. This movement continues until the next outwardly-turned selecting-dog 70 collides with the top of the buffer 73, as shown in Fig. 11, which during this time is held in its upper position by the pressure from the chambers 46, communicating through the passage 75 with the pressure-chamber beneath the buffer. The elastic character of the fluid-pressure permits the buffer to yield downwardly and cushion the impact of the turret, due to its forward movement or momentum. Then on account of the fact that the pressure area of the stop-piston 73 is greater than the combined areas of the wings 48 of the piston 45 the forward pressure against those wings will be overbalanced by the pressure upon the stop-piston, so that the latter will react through its engaging selecting-dog and push the turret backward until the stop-piston reaches the top of its chamber, at which position the appropriate locking-notch 42 is brought into alinement with the locking-bolt 43, as shown in Fig. 11. Then as the turret-slide is moved forward by its feeding devices the projecting stem of the valve 78 is carried away from the dog 81, so that the latter is pushed by the spring 80 to the position of Fig. 10, thereby admitting the pressure through the passage 64, which operates in the pressure-chamber 60 to push the locking-bolt 43 upwardly and seat it in its notch 42. This upward movement of the locking-bolt opens the passage 68, leading to the pressure-chambers 46, through which the pressure reaches the rearward sides of the piston-wings 48 and entering through the ports 56 pushes the piston-pawl 41 outwardly clear of the ratchet 35, the continuing pressure operating upon the wings 48 to rotate the piston 45 backwardly, carrying the pawl to its rearward or resting position. (Shown in Fig. 10.) At the same time that the pressure enters the pressure-chambers 46 it enters the clearance-space or pressure-chamber 32 beyond the clamping-piston 30 and serves to clamp the piston to the conical seat formed by the beveled surfaces 28 and 29. During the backward movement of the piston 45 the pressure in the rearward ends of the chambers 46 behind the wings 48 is exhausted through the exhaust-passages 69 and 65, as shown in Fig. 10. When the valve 78 shifts to the position shown in Fig. 11 for the forward or indexing movement of the turret, the pressure in the pressure-chamber 32 for the clamping-piston 30 is exhausted through the passage 33 into the pressure-chamber 46, and with the pressure of that chamber, which is in front of the wings 48, is exhausted through the passages 68 and 65, as indicated by the arrows in Fig. 11. The pawl 41 rests in its rearward position (shown in Fig. 10) until the next succeeding actuation of the valve, which operates, as already described, to admit the pressure through the passage 65, retracting the locking-bolt 43, moving the piston-pawl 41 into its adjacent notch 40, and pushing the piston 45 around to again advance the turret. During the first portion of this advancing movement the selecting-dog 70 passes by the buffer 73 by depressing the latter to the bottom of its movement. In order to permit the buffer to be thus depressed without resisting the forward movement of the turret, the end of the passage 75, communicating between the chambers 74 and 46, is extended by means of the channels 91 in the walls of the chambers 46, so that the pressure-chamber 74 below the buffer 73 remains in communication with the forward or exhaust side of the piston-wings 48 until the dog reaches the point shown in Fig. 12, where it passes by the buffer. Up to this point also the entrance to the passage 75 from the chambers 46 is covered by the wings 48, as also shown in Fig. 12, so that the pressure is not admitted to the chamber 74 until the dog has passed the buffer 73 far enough to avoid the liability of retarding the forward movement of the turret by the buffer 73.

In the usual forms of indexing apparatus the extent of indexing movement is determined by the amplitude of angular movement of the indexing-pawl. Hence it is desirable and even necessary in that type of apparatus to index the device to an equal angular extent at each movement; but by the present arrangement, where the amplitude of each movement of the indexing-pawl may be varied to any required extent, it is not necessary to have equal angular intervals between the stopping positions. Therefore the space around the turret may be apportioned according to the several requirements of the respective tools as to space. In this way considerable space can be gained for additional tools or for the use of larger tools by spacing the smaller tools closer together.

When the full complement of tools is always to be used in the turret, requiring it always to be stopped in every position, the dogs 70 may obviously be fixed or non-adjustable; but where, as herein illustrated, some of the turret-space is not utilized it is desirable to have the corresponding dogs thus movable out of operative relation, so that the turret may be indexed at once past the intermediate unused positions directly to the next tool to be used, thus economizing time in the operation of the machine.

The two annular chambers 46 constitute, in effect, a single chamber, being herein separated by the annular ring 47 for the purpose of balancing the pressure equally on both sides of that ring, so that it will oscillate freely without side strains. Likewise the two wings 48 constitute, in effect, a single piston.

The arrangement and proportions of the apparatus herein shown are adapted for the use of compressed air as an operating medium; but they may obviously be adapted for the use of any other available fluid-pressure medium. In many other ways that will be obvious to those skilled in the art the apparatus may be modified and its applications extended.

I claim as my invention—

1. In an indexing device, the combination with a movable element thereof, of an annular pressure-chamber, an oscillating piston mounted therein, and provided with a pressure-chamber, a pawl-piston mounted in the latter chamber, and engaging with the movable element of the indexing device, means for conducting fluid-pressure from the annular chamber to both ends of the pawl-piston to move it into and out of indexing position, and means for admitting the fluid-pressure to both sides of the annular piston to impart its oscillating movement.

2. In an indexing device, the combination with a movable element thereof, of an annular pressure-chamber, an oscillating piston mounted therein and provided with a pressure-chamber, a pawl-piston mounted in the latter chamber, and engaging with the movable element of the indexing device, ports 55 and 56 communicating from opposite sides of the oscillating piston to the opposite ends of the pawl-piston; and means for alternately admitting fluid-pressure to opposite sides of the oscillating piston to impart the movements to the reciprocating pawl-piston and the oscillating piston.

3. In combination with a movable element of an indexing device, an annular pressure-chamber, an oscillating piston mounted therein, comprising a ring for centering the piston, provided with a projecting wing for receiving the pressure, and provided with means for engaging with the movable element.

4. The combination with a movable element of an indexing device, of an annular pressure-chamber, an oscillating piston mounted therein, comprising a ring for centering the piston, provided with oppositely-extending wings for receiving the pressure, and provided with a pressure-chamber and a pawl for engaging with the movable element of the indexing device.

5. The combination with a movable element of an indexing device, of an annular pressure-chamber, an oscillating piston mounted therein, comprising an annular ring provided with oppositely-extending wings fitting the chamber for receiving the pressure, and provided with a pressure-chamber, and a piston-pawl for engaging with the movable element of the indexing device, and means for conducting fluid-pressure to opposite ends of the pawl-piston from the annular pressure-chamber on opposite sides of the wings.

6. The combination with a movable element of an indexing device, of an annular pressure-chamber, an oscillating piston mounted therein, comprising a ring for centering the piston, provided with oppositely-extending wings fitting the annular pressure-chamber, for receiving fluid-pressure to oscillate the piston in both directions, and provided with a pressure-chamber, and a pawl-piston for engaging with the movable element of the indexing device, and ports for conducting the fluid-pressure from the annular chamber to the pawl-piston chamber, communicating from one side of the wings to one end of the chamber, and from the other side of the wings to the other end of the chamber.

7. The combination of the ratchet 35, the pressure-chamber 46, the piston 45 having the pressure-chamber 51, the index-pawl 41, and means for oscillating the piston 45.

8. The combination with a movable element of an indexing device, of a fluid-pressure-operated reciprocating member for indexing the said element, a locking-bolt for the movable element, and means for operating the locking-bolt by fluid-pressure.

9. The combination, in fluid-pressure-operated indexing mechanism, of a movable element, a locking-bolt therefor, reciprocating means for advancing the movable element, and means for applying and retracting the locking-bolt by the fluid-pressure employed for advancing the movable element.

10. The combination, in fluid-pressure-operated indexing mechanism, of a movable element, a locking-bolt therefor, a reciprocating member for advancing the movable element, and means for directing fluid-pressure to operate first the locking-bolt and then the reciprocating member, for the advancing and returning movements thereof.

11. The combination, in fluid-pressure-operated mechanism, of a movable element, a locking-bolt therefor, a pressure-engine for the locking-bolt, a pressure-engine for advancing the movable element, and means for directing pressure to the respective engines to operate first the locking-bolt engine, and then the advancing engine.

12. In combination with a movable element of fluid-pressure-operated indexing mechanism, an advancing and returning member for indexing the movable element, a locking-bolt for the said movable element, and means for directing the fluid-pressure to apply the locking-bolt before effecting the return movement of the indexing member.

13. The combination in fluid-pressure-operated indexing mechanism, of a ratchet, a pawl for advancing the ratchet, a piston for operating the pawl, a locking-bolt for the ratchet, and means for directing fluid-pressure to actuate first the locking-bolt and then the pawl-piston.

14. In fluid-pressure-operated indexing mechanism, the combination of an indexing-ratchet, an oscillating piston for the advancing movement of the ratchet, means for oscillating the piston, a locking-bolt for the ratchet, and means for directing the fluid-pressure to retract the locking-bolt before advancing the piston.

15. The combination, with a turret mechanism, of a ratchet, a fluid-pressure engine, having its piston mounted to oscillate concentrically with the ratchet, and having a pawl for engaging with the ratchet, and means for conducting fluid-pressure to the engine for imparting its oscillating indexing movements.

16. The combination, with turret mechanism, of a ratchet appurtenant to the turret, a fluid-pressure engine, having its piston mounted to oscillate concentrically with the ratchet, the said piston constituting a fluid-pressure engine for engagement and disengagement between the first engine and the ratchet, passages connecting opposite sides of one engine with the respective opposite sides of the other engine, and means for controlling the admission of fluid-pressure alternately to opposite sides of the oscillating piston for imparting the indexing movements to both engines.

17. The combination with turret mechanism, of a ratchet, a fluid-pressure engine, having its piston mounted to oscillate concentrically with the ratchet, the said piston constituting a second fluid-pressure engine for engaging with the ratchet, a locking-bolt for engaging with the ratchet, a pressure-chamber for the locking-bolt, and means for directing fluid-pressure, first to withdraw the locking-bolt from the ratchet, and then to advance the oscillating piston for the forward indexing movement.

18. The combination with turret mechanism, of a ratchet, a fluid-pressure engine, having its piston mounted to oscillate concentrically with the ratchet, the said piston constituting a second engine for engaging the oscillating piston with the ratchet, a locking-bolt for engaging with the ratchet, and means for directing the fluid-pressure first to move the locking-bolt into engagement with the ratchet, then to withdraw the second engine from the ratchet, and then to return the oscillating piston to its initial position.

19. The combination with turret mechanism, of a ratchet, a fluid-pressure-operated piston, mounted to oscillate concentrically with the ratchet, an annular pressure-chamber for the piston, an indexing-pawl, and a piston and pressure chamber therefor, carried by the oscillating piston, a locking-bolt, a pressure-chamber therefor, and means for directing fluid-pressure to operate the locking-bolt in advance of the indexing movements of the pawl at each end of those movements.

20. The combination with turret mechanism, of a pressure-chamber and piston appurtenant to the turret, and means for admitting fluid-pressure to the pressure-chamber to automatically clamp the turret in its indexed positions.

21. The combination with a turret mechanism, of a pressure-chamber, a piston carried by the turret, and means for admitting fluid-pressure to the chamber to operate the piston for clamping the turret in its indexed positions.

22. The combination with turret mechanism, of a pressure-chamber, a piston operatively connected with the turret, and arranged to clamp the latter to its bearings when pressure is admitted, and means for admitting pressure to the pressure-chamber.

23. The combination in a turret mechanism, of a rotatable turret, having a conical seat, a piston and pressure-chamber appurtenant to the turret, and arranged to clamp the turret in its conical seat when pressure is admitted, and means for admitting pressure to the chamber.

24. The combination in a turret mechanism, of a fluid-pressure chamber and piston appurtenant to the turret for clamping the turret, a fluid-pressure engine for indexing the turret, and means for communicating fluid-pressure from the engine to the clamping-pressure chamber, during the intervals between the indexing movements.

25. The combination with turret mechanism, of a fluid-pressure chamber and piston for indexing the turret, means for admitting fluid-pressure alternately to opposite sides of the piston for causing its indexing movement, a pressure-chamber and piston appurtenant to the turret for clamping the latter in its indexed positions, and means for conducting the fluid-pressure to the clamping-piston and chamber.

26. The combination with turret mechanism, of a ratchet appurtenant to the turret, an oscillating piston, and annular pressure-chamber therefor arranged concentrically with the ratchet, and provided with a pawl for engaging with the ratchet, a clamping-piston and pressure-chamber therefor appurtenant to the turret, and means for conducting fluid-pressure from the annular pressure-chamber to the clamping-piston to clamp the turret during the intermissions of the indexing movements.

27. The combination with turret mechanism, of a fluid-pressure-operated piston, and pressure-chamber for indexing the turret, a locking-bolt and pressure-chamber therefor, for locking the turret in its indexed positions, a clamping-piston and pressure-chamber therefor appurtenant to the turret, and pressure-passages controlled by the movements of the locking-bolt, as a valve, for controlling the admission of the fluid-pressure in proper sequence to the oscillating piston and the clamping-piston, respectively.

28. In an indexing device, the combination of a fluid-pressure engine for engaging and advancing the member to be indexed, and a fluid-pressure-operated locking-bolt for locking the said member in its indexed positions, the said locking-bolt being arranged to effect the valvular control of the fluid-pressure engine.

29. In an indexing device, the combination of a fluid-pressure engine for engaging and advancing the member to be indexed, and a fluid-pressure engine for engaging with and locking the said member in its indexed positions, and means whereby a moving part of one engine effects the valvular control of the other engine.

30. In combination with fluid-pressure-operated indexing devices, a stop for engaging with the indexed member approximately at its desired stopping positions, a pressure-chamber for the stop, means for conducting the fluid-pressure to the chamber to operate the stop, and means for exhausting the fluid-pressure therefrom, to permit of the succeeding movement of the indexed member.

31. The combination with indexing mechanism, of a fluid-pressure engine for engaging with and advancing the indexed member, and a single-acting fluid-pressure engine for engaging with the indexed member to oppose and stop the indexing movement imparted by the other engine, and to return the indexed member to its desired position.

32. In an indexing device the combination of an indexing-piston and pressure-chamber therefor, a stop for engaging with the indexed member approximately at its indexed positions, a pressure-chamber for the stop, means for conducting the fluid-pressure from the indexing-pressure chamber to the pressure-chamber of the stop, and means for exhausting the stop-pressure chamber during the first portion of the indexing movement.

33. In an indexing device, the combination of a piston and a pressure-chamber for the indexing devices, a stop for stopping the indexed member at its indexed position, a pressure-chamber for the stop, and a passage connecting the two pressure-chambers opening from the piston-chamber by a port located to communicate with the exhaust side of the piston during the first portion of the travel of the piston, and to be uncovered by that travel to communicate with the pressure side of the piston at a predetermined point in that travel.

34. In a fluid-pressure-operated indexing device, the combination of a piston for effecting the indexing movement, a piston for stopping that movement, having a pressure area greater than that of the indexing-piston, and means for admitting fluid-pressure to both pistons.

35. In a fluid-pressure-operated indexing device, the combination of a piston for effecting the indexing movement, a piston for stopping that movement, and engaging with the indexed member approximately at its stopping position, pressure-chambers for the respective pistons, and means for admitting substantially the same pressure to both pistons.

36. In a fluid-pressure-operated indexing device, the combination of a piston for effecting the indexing movement, a piston for engaging with the indexed member approximately at its desired stopping positions, having a pressure area greater than that of the indexing-piston, pressure-chambers for the two pistons and means for admitting the fluid-pressure from one chamber to the other, at suitable times.

37. In an indexing device, the combination of an annular pressure-chamber, a pawl-piston mounted to oscillate therein, a piston provided with a stop for engaging with the indexed member approximately at its required stopping positions, having a pressure area greater than that of the oscillating pawl-piston, a pressure-chamber for the stop-piston and means for admitting the fluid-pressure to operate first the pawl-piston and then the stop-piston.

38. The combination in indexing mechanism, of a fluid-pressure engine for advancing the indexed member, a fluid-pressure engine of greater power for engaging with the indexed member to oppose and stop its advancing movement, and means for supplying pressure to both engines from a common pressure-chamber.

39. The combination in indexing mechanism, of a double-acting fluid-pressure engine for advancing the indexed member, a single-acting fluid-pressure engine of greater power for engaging with the said indexed member to oppose and stop its advancing movement, and means for communicating fluid-pressure to both engines from a common pressure-chamber.

40. In an indexing device, the combination of a double-acting fluid-pressure engine for advancing the indexed member, a single-acting fluid-pressure engine for engaging with the indexed member to oppose and stop the forward movement imparted by the other engine, and return it to its desired stopping position, and a fluid-pressure engine for locking the indexed member in the said position, and means whereby the latter engine effects the valvular control of the other two engines.

41. In an indexing device, the combination of an indexed member, a series of adjustable dogs mounted thereon for determining its stopping position, and a fluid-pressure engine for engaging with the said dogs to arrest the forward movement of the indexed member and return it to its desired indexed positions.

42. In an indexing device, the combination of an indexed member, a series of dogs mounted thereon for determining its stopping positions, and movable into and out of operative position; and a fluid-pressure engine for engaging with the dogs which are in operative position to arrest the forward movements of the indexed member, and return it to its desired indexed portions.

43. In combination with an indexing device, a resiliently-mounted stop and buffer, and a series of stop-dogs carried with the indexed member and movable into and out of engaging relation to the stop.

44. The combination with turret mechanism, of a fluid-pressure engine for engaging with and advancing the turret, a series of dogs appurtenant to the turret and movable into and out of operative position, and a single-acting fluid-pressure engine for engaging with the dogs which are in operative position for stopping the advancing movement of the turret, and returning it to the indexed positions determined by the dogs.

45. The combination with turret mechanism, of a fluid-pressure engine for advancing the turret, a series of dogs appurtenant to the turret, and movable into and out of operative position, a single-acting fluid-pressure engine for engaging with the stops that are in operative position to stop the turret and return it to its desired indexed positions, a locking-bolt for the turret, and a fluid-pressure engine for operating the locking-bolt, and means whereby the latter engine effects the valvular control of the other two engines.

46. In an indexing mechanism, in combination with the indexed member thereof, a fluid-pressure engine for advancing the indexed member beyond the required indexed position, and a fluid-pressure engine for engaging with the indexed member to cushion its advancing movement, and return it to its correct position.

47. In indexing mechanism, the combination with the indexed member thereof, of a fluid-pressure engine for advancing the indexed member beyond its required indexed positions, a fluid-pressure engine for engaging with the indexed member when the latter reaches its indexed positions, and means for communicating fluid-pressure to the latter engine, to yieldingly hold it at the forward limit of its stroke when it engages with the indexed member, to cushion the movement of the indexed member and return it to its correct position.

48. In indexing mechanism, the combination with the indexed member, of a fluid-pressure engine for advancing the indexed member beyond its required indexed positions, a series of dogs appurtenant to the indexed member for determining its respective indexing positions, a fluid-pressure engine for engaging with the dogs at the indexing positions, the latter engine being arranged to engage with the dogs at the forward limit of its stroke, and means for directing fluid-pressure to the respective engines.

Signed at Hartford, Connecticut, this 25th day of January, 1902.

BENGT M. W. HANSON.

Witnesses:
FRED. W. GORDON,
F. V. BARTLETT.